United States Patent
Shi et al.

(10) Patent No.: US 8,345,334 B2
(45) Date of Patent: Jan. 1, 2013

(54) MASTERING AND REPLICATION OF MICRO-HOLOGRAPHIC DATA STORAGE MEDIA

(75) Inventors: Xiaolei Shi, Niskayuna, NY (US); Kenneth Brakeley Welles, Scotia, NY (US); John Erik Hershey, Ballston Lake, NY (US); John Anderson Fergus Ross, Niskayuna, NY (US); Brian Lee Lawrence, Niskayuna, NY (US); Zhiyuan Ren, Malta, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 648 days.

(21) Appl. No.: 12/347,211

(22) Filed: Dec. 31, 2008

(65) Prior Publication Data

US 2010/0165819 A1    Jul. 1, 2010

(51) Int. Cl.
*G03H 1/20* (2006.01)
*G11B 7/00* (2006.01)
(52) U.S. Cl. .......................... 359/12; 369/103
(58) Field of Classification Search .............. 359/12, 359/22; 369/103
See application file for complete search history.

(56) References Cited

U.S. PATENT DOCUMENTS

| | | | |
|---|---|---|---|
| 4,943,126 A * | 7/1990 | Lang et al. ................ | 359/12 |
| 5,450,218 A | 9/1995 | Heanue et al. | |
| 5,510,912 A | 4/1996 | Blaum et al. | |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,889,907 B2 | 5/2005 | Roh | |
| 7,020,054 B2 | 3/2006 | Kadlec et al. | |
| 7,116,626 B1 * | 10/2006 | Woods et al. ............... | 369/103 |
| 7,388,695 B2 | 6/2008 | Lawrence et al. | |
| 7,885,164 B2 * | 2/2011 | Horimai ..................... | 369/103 |
| 2005/0036182 A1 * | 2/2005 | Curtis et al. ................ | 359/15 |
| 2005/0136333 A1 | 6/2005 | Lawrence et al. | |
| 2006/0002274 A1 | 1/2006 | Kihara et al. | |
| 2006/0073392 A1 | 4/2006 | Erben et al. | |
| 2006/0078802 A1 | 4/2006 | Chan et al. | |

(Continued)

FOREIGN PATENT DOCUMENTS

WO    2006125079    11/2006

OTHER PUBLICATIONS

Ernest Chuang, et al.; Consumer Holographic ROM Reader with Mastering and Replication Technology; OCIS (210.2860) Holographic and volume memories, (090.0090) Holography; (210.0210) Optical Data Storage; 2006, pp. 224-226.

(Continued)

*Primary Examiner* — Alessandro Amari
(74) *Attorney, Agent, or Firm* — Jean Testa; Fletcher Yoder (57) ABSTRACT

A system and method for replicating optical data storage discs (e.g., holographic data storage discs) having multiple layers of data. Master discs providing for respective single layers of data are utilized, and each respective single layer of data from the master discs are replicate onto the optical data storage disc.

25 Claims, 7 Drawing Sheets

U.S. PATENT DOCUMENTS

| | | |
|---|---|---|
| 2006/0227398 A1 | 10/2006 | Lawrence et al. |
| 2007/0053029 A1 | 3/2007 | Raguin et al. |
| 2007/0097469 A1 | 5/2007 | Erben et al. |
| 2007/0146835 A1 | 6/2007 | Erben et al. |
| 2008/0055686 A1 | 3/2008 | Erben et al. |
| 2008/0144145 A1 | 6/2008 | Boden et al. |
| 2008/0144146 A1 | 6/2008 | Boden et al. |

OTHER PUBLICATIONS

Ernest Chuang, et al.; Holographic Read-Only Memory System for High-Speed Replication; Jpn. J. Appl. Phys. vol. 42 (2003) pp. 976-980; Part 1, No. 2B, Feb. 2003.

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/347,178, filed Dec. 31, 2008, Victor Petrovich Ostroverkhov.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/336,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

U.S. Appl. No. 12/346,279, filed Dec. 30, 2008, Victor Petrovich Ostroverkhov.

U.S. Appl. No. 12/346,378, filed Dec. 30, 2008, Xiaolei Shi.

* cited by examiner

MASTERING AND REPLICATION OF MICRO-HOLOGRAPHIC DATA STORAGE MEDIA

BACKGROUND

The present techniques relate generally to optical data storage media having multiple layers of data (e.g., holographic data storage). More specifically, the techniques relate to methods and systems for replicating such media.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, they have been difficult to replicate. Accordingly, techniques that improve the efficiency, quality, cost, and throughput of replication of holographic storage media may be advantageous.

BRIEF DESCRIPTION

An aspect of the invention relates to a method of replicating optical data storage discs, including providing master discs having a respective single layer of data, and optically replicating each respective single layer of data from the master discs into an optical data storage disc comprising multiple layers of data.

An aspect of the invention relates to a method of replicating holographic storage discs, including providing master discs each providing for a respective single layer of data to be replicated on a holographic data storage disc, and replicating each respective layer of data from the master discs into a holographic data storage disc.

An aspect of the invention relates to a method of replicating optical data storage discs, including: disposing optical storage discs on a movable structure; disposing master discs at replication stations, wherein the master discs each having a single layer of data to be replicated on the optical storage discs; activating the structure to respectively position the optical storage discs adjacent each master disc; and optically replicating the single layers of data into the optical storage discs.

An aspect of the invention relates to a system for replicating holographic data storage discs, the system having: replicating stations configured to hold stationary master discs having a respective layer of data to be replicated on a plurality of holographic data storage discs; and a structure configured to hold the plurality of holographic data storage discs and to pass the plurality of holographic data storage discs adjacent the stations.

An aspect of the invention relates to a method of replicating multiple layers of data into an optical storage disc, including replicating one layer of data at a time into the optical storage disc: via a single or plurality of master discs each providing for a different layer of data to be replicated; or via a master disc has a spatial light modulator (SLM), wherein states of pixels in the SLM are electrically changed to provide for replication of different layers of data; or both.

An aspect of the invention relates to a system for replicating multiple layers of data into an optical storage disc, including: a master disc having a spatial light modulator (SLM); a processor configured to change states of pixels in the SLM to respectively provide for replication of each layer of data; a replicating station; and a structure configured to position the master disc and the optical storage disc adjacent one another at the replicating station.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Volumetric Optical Storage

Volumetric optical storage systems have the potential to fulfill demands for high-capacity data storage. Unlike traditional optical disc storage formats, such as compact disc (CD) and digital versatile disc (DVD) formats, where the digital information is stored in a single or a small number of reflective layer(s), digital content is stored as localized refractive index alterations in a plurality of volumes arranged in vertically stacked, laterally directed tracks in the storage medium. Each of the tracks may define a corresponding laterally, e.g., radially, directed layer.

Single bits, or groups of bits, of data may be encoded as individual micro-holograms each substantially contained in a corresponding one of the volumes. In one example, the medium, or media, takes the form of an injection moldable thermoplastic disc. By generating interference fringes within a given volume of the medium, one or more bits of data may be selectively encoded in that volume as a later detectable refractive index modulation. Three-dimensional, molecular, photoresponsive matrix of refractive index changes may thus be used to store data This functional characteristic may establish a threshold energy responsive condition, below which no substantial change in refractive index occurs and above which a measurable change in the refractive index is induced. In this manner, a selected volume can be read, or recovered, by impinging a light beam having a delivered energy less than the threshold, and written or erased using a light beam having a delivered energy above the threshold. Accordingly, dense matrices of volumes that each may, or may not, have a micro-hologram substantially contained therein may be established. Each of the micro-holograms may be embodied as an alternating pattern of sub-regions having differing refractive indices, which correspond to the interference fringes of counter-propagating light beams used to write the micro-holograms. Where the refractive index modulation decays rapidly as a function of distance from a target volume, such as an encoded bit center, the more densely the volumes may be packed.

The refractive index changes in a particular volume may be induced by localized heating patterns (corresponding to the interfering fringes of counter-propagating laser beams passing through the volume). In one embodiment, the refractive index change results from a density difference between an amorphous and crystalline state of a thermoplastic medium. A transition from one to the other state may be selectively induced in target volumes of a medium by thermally activating sub-volumes of the target volume at interference fringes therein. Alternatively, the refractive index changes may be induced by a chemical change within sub-volumes of target volume of the medium, such as a chemical change occurring in a dye or other catalyst within a dye, located within the target volume. Such a chemical change may be selectively induced using thermal activation as well. For a discussion of various aspects of holographic data storage, see U.S. Pat. No. 7,388,695, incorporated herein by reference in its entirety. In addition, it should be noted that the present techniques may apply to multi-layer storage beyond holographic storage, such as with 2-photon storage, for example.

Pre-Formatting of Volumetric Optical Storage

In addition to pre-recording data information in a holographic media disc for content delivery (e.g., content is a pre-recorded movie for delivery to the consumer), the holographic discs may be pre-formatted for recording of data. For example, holographic media discs may be recorded with arrays of micro-holograms indicative of a data state. These arrays may be spread throughout substantially all of the volume of a medium made of an optically or threshold responsive recording material. In one embodiment, particular data (e.g., alternating states of data) are recorded in the pre-formatted media by erasing or not-erasing certain ones of the micro-holograms. Erasing may be effected by using a single light beam with enough focused energy to bring the volume of the micro-hologram above the threshold condition, e.g., heating to approach Tg of a constituent polymer matrix.

More particularly, recording of data into a pre-formatted medium (e.g., an array of micro-holograms indicative of a single data state, e.g., all 0's or all 1's within an optically responsive material), may be accomplished by either erasing or not erasing select ones of the pre-recorded, or pre-formatted, micro-holograms. A micro-hologram may be effectively erased by focusing one or more laser beams there-upon. Where the light beam delivered energy exceeds the writing threshold intensity, as discussed herein-above, the micro-hologram is erased. Thus, the threshold condition may be the same needed to be satisfied to form the targeted micro-hologram in the first place. The light beam may emanate from a conventional diode laser, similar to those conventionally used in CD and DVD technologies.

Replication Overview

Optical data storage modalities (CD/DVD/HD-DVD/BD) in general may typically use a replication system based on injection molding of the discs. This mechanical approach is generally not employed for micro-holographic discs as the holographic data is typically stored in a fringe pattern and thus an optical approach is advantageous. In addition, with holographic storage, a largely or substantially monolithic media (the disc media may have other layers such as substrate and cover layers) is typically used to store the multi-layer data. Therefore, it may be advantageous to pattern the data using a noninvasive method, such as an optical method.

Optical replication of micro-holographic discs may replicate multiple layers of data at once. Indeed, the replication may utilize a master (e.g., master disc) with all of the data layers (having micro-holograms) to be replicated. However, replication of multiple layers at once onto the holographic disc may not be efficient or feasible due to the typically relatively low diffraction efficiency of the micro-holograms, for example. Thus, in certain embodiments of the present technique, multiple master discs each having a single layer to be replicated are utilized for replicating a holographic disc. Consequently, the technique may provide an efficient mastering and replication systems and approaches for patterning multi-layer micro-holographic storage discs. The technique is directed to a new master design and new replication system for micro-holographic replication for both content delivery and disc pre-format applications. In sum, the mastering and replication of a substantially monolithic multi-layer micro-holographic discs with high efficiency and thus high throughput (and potentially lower cost as well) may be realized.

As indicated, the technique may utilize multiple masters having a single layer of data for the multi-layer holographic disc. As described below, the replication of each layer of data may be performed at replication stations, the respective layers may be replicated simultaneously on separate holographic discs, and a large beam exposure may be used on different discs, and so on. Moreover, part of the layers may be replication at one exposure with synchronized rotation of the master or disc to cover the whole layer. As mentioned, the replication may give multiple layers of data information for content distribution, and/or the replication may pre-format the discs may with multiple layers of bits intended for recordable disc applications. Discs may have mixed layers of both pre-recorded content and pre-format bits. Such mixed layers may be used for certain applications for recording into the disc, yet with data information (i.e., pre-recorded content) already on the disc.

As discussed below, the technique may employ transmission and/or reflection geometries for replication. Moreover, features may facilitate the tilt alignment for the respective master and the disc at each station. Such features may include tilt alignment marks on the masters and the discs, an imaging system to detect the tilt, a control system to adjust the tilt of the master and the disc through a mechanical module, and so forth. The technique may also include master and disc registration to provide for layer-to-layer alignment as well as a synchronization scheme between the master and the disc during replication.

Master Discs

Figure 1:
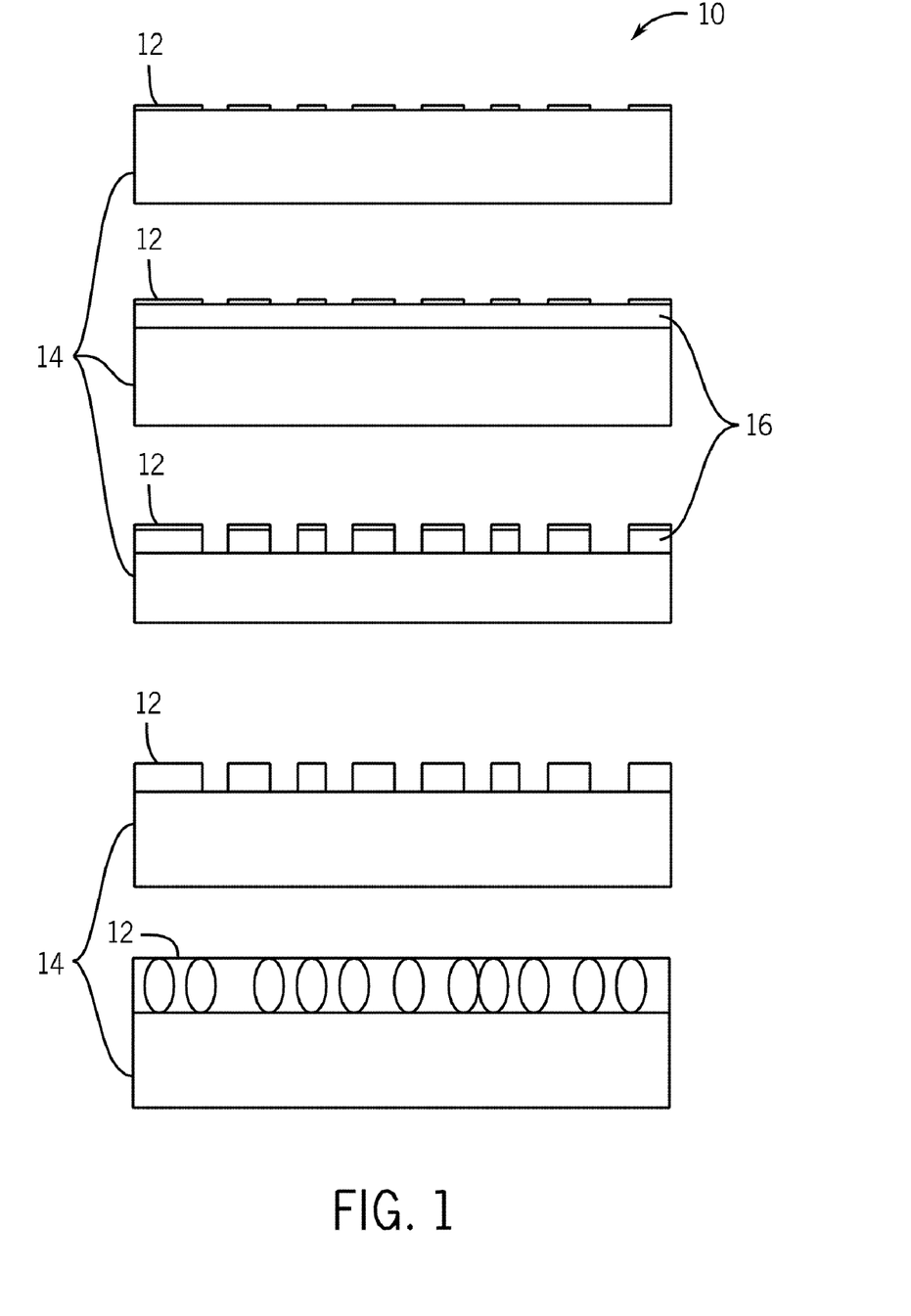
FIG. 1 is a diagrammatical representation of various master disc structures in accordance with embodiments of the present technique.

FIG. 1 depicts various exemplary master discs 10 having different geometries of data layers 12 and substrates 14. The master discs 10 may also have intermediate layers 16 disposed between the data layer 12 and substrate 14. In embodiments, a master disc has only one layer of data (to be replicated) and the data can be either micro-holograms, simple reflective/transmission bit patterns in a planar substrate, and so on. Thus, in certain embodiments, while the master discs themselves may not contain complete holographic data, the multiple master discs may be used to replicate holographic data in holographic data storage discs (i.e., one layer at a time). A separate master disc may be used for each data layer. Moreover, separate master discs may contain the same or different contents, depending on the particular applications. The master disc can use a material/structure that is different from the micro-hologram storage disc. In a certain embodiment, a master disc may be a layer of patterned Cr film on glass substrate, which may be prepared in a similar way as masks for optical lithography.

In the master data layers 12, the data bits may be arranged in tracks with track features (e.g., windings) supporting tracking clocking and/or layer identifications, and the like. The data layers 12 may be metallic, dielectric materials, and so on. Data bits in the data layers 12 can be larger if using reduction optics in the employed replication system, for example. The intermediate layers 16, if applied, may be a single layer or multi-layers to enhance the reflectivity contrast of the data layer 12, support adhesion and/or compatibility with the substrate 14, and so forth. The substrate 14 may be glass silica, silicon, other typical substrate materials, and the like. Master discs 10 may be manufacture via conventional master recording systems. In certain embodiments, master disc processing such as direct laser writing, metal evaporation, lift-off, and so on, may be utilized. Moreover, various processing may be employed for different master structures.

In some embodiments, a spatial light modulator (SLM) may be used as a master. An SLM typically has a two-dimensional array of pixels. The "on" and "off" state of the pixel may represent digital data bit "1" or "0". The state of the pixel can be electrically switched. The SLMs can be digital micromirror device (DMD) or liquid crystal based, and the like. For example, the SLM master could be an arrangement of light and dark (or clear and not-clear areas) on an LCD mask. Light could be directed through LCD mask for writing each layer. A processor or computer could then change the "image" on the mask for the next layer. It should be noted that high data transfer rates (e.g., ~50 Gbps) for SLMs are available. An advantage of using a SLM as a master is that the same SLM may represent different master contents by electrically changing the states of the pixels. The SLM master may be thought of as a configurable master or mask.

Replication Techniques

Figure 2:
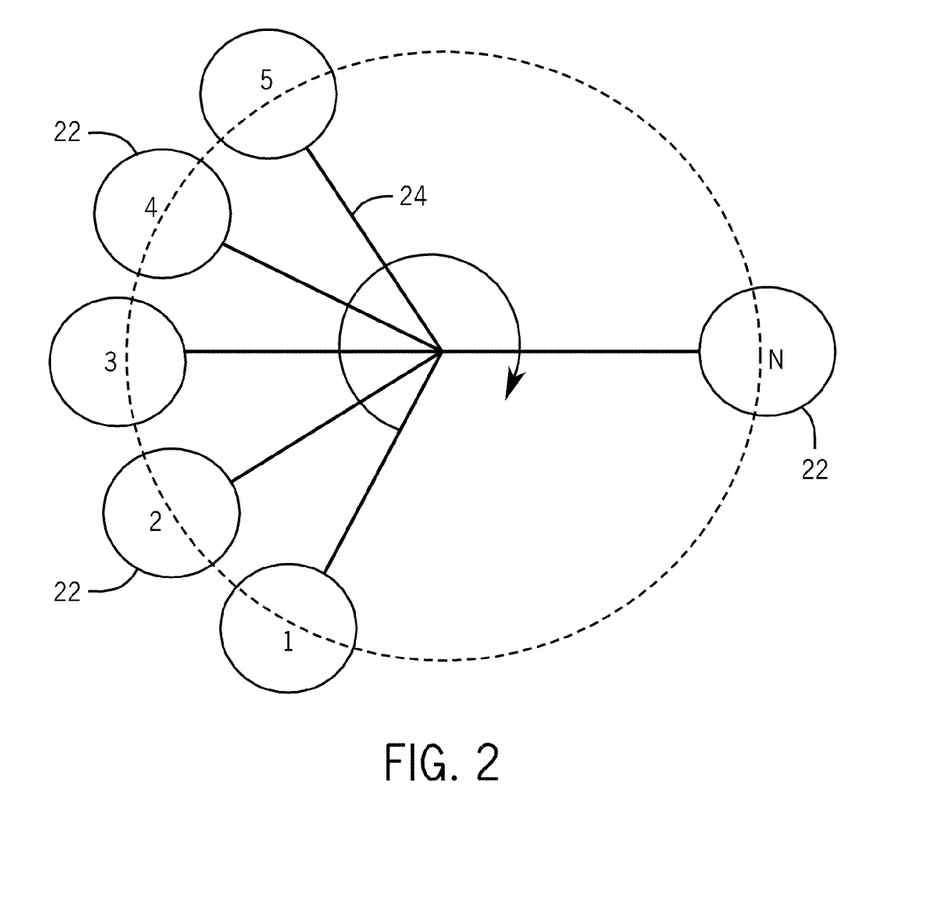
FIG. 2 is a diagrammatical representation of disc replication in accordance with an embodiment of the present technique.

FIG. 2 depicts an exemplary disc replication technique 10 where discs 22 are situated on a structure 24 and rotated or moved past master discs for replication of the discs 22. The replication technique may employ multiple "stations." At each station, there is a master disc for a specific data layer, discs to be replicated, as well as a replication system. The replication stations may be run simultaneously. Multi-layer replication may be achieved by transporting the discs to various stations. Such discs may be held in place by a vacuum system, for example. Moreover, a thermal control unit (i.e., cooling system) may be incorporated to assist replication.

At each station, replication may be performed by interference of a planewave with the image of the data patterns of the master at a determined depth in the disc (e.g., a threshold disc). Full disc pattern (in one layer) may be replicated in one exposure (if the laser power is strong enough) or a certain region is replicated in one exposure and the disc pattern is replicated by spinning the master and media disc synchronized. See FIGS. 3-5 and associated text for exemplary configurations for replicating optics. Further, reduction optics may be applied to improve the replication quality. (With reduction optics, a size of a bit replicated on the holographic data storage disc may be smaller than a size of a corresponding bit on the master disc.) In addition, in certain instances, focusing/tracking schemes may be used to assist the replication.

It should be noted that in contrast to the illustrated embodiment of FIG. 2, the master discs may be mounted on the structure 24 and moved or rotated, and the discs 22 not on the structure and instead held stationary at the stations. Moreover, it should be emphasized that the carousel structure 24 is only given as an example. Indeed, other configurations for positioning the master discs and discs to be replicated may be used. Lastly, it should be noted that one of more of the master discs may be a SLM master. Moreover, a single SLM master may be used to replicate multiple layers of data one layer at a time, and a structure may position the holographic disc and the SLM master adjacent one another with appropriate distances between them for different layers at a replicating station.

Whether or not a SLM master is employed, it should be noted that in certain embodiments, the reflection/transmission contrast from the master disc can be high (e.g., greater than 90%) so that the laser power is efficiently used for data replication. In other replication approaches, the diffraction efficiency is below 1% and typically approximately 0.1%-0.01%, the replication efficiency is low and the replication is likely to be limited. The present technique may facilitate lower replication cost and higher replication throughput. In addition, the quality of the master may be relatively higher as it has only one data layer, especially in the case when the bits are simple reflective/transmission patterns not micro-holograms. Also, there may be no layer-layer interference noise from the present master discs as it typically has only one layer.

The present technique may provide for lower cost, higher throughput, quality replication, and flexibility. Indeed, the optical design and electronics control may generally be simpler for each replication station as compared to employment of a multi-layer master. Similarly, replication throughput may be higher. Moreover, the single-layer master disc preparation may beneficially leverage current optical lithography mask preparation, such as in the case where the data bits are simple reflective/transmission patterns. Also, in the subsequent multi-layer replication and storage, yield with the single-layer master discs can be higher than multi-layer master discs. Likewise, replication laser power may be lower.

In addition, in certain instances, the present master discs may be reused. For example, master discs can be flexibly reused in a mixed fashion among different replication discs, such as when the discs have some common layers of data. Indeed, flexibility may be implemented, for example, by having multiple masters (e.g., a 1000 masters) but employing only certain masters (e.g., 100 masters) in different combinations to replicate the holographic storage discs. This may lead to novel applications facilitated by this replication technique, such as a juke-box type application, and so on.

What is more, in some embodiments, the replication process may implement a quality or performance check after each write. In other words, the replicated disc may be read and compared to the master. The quality check may be performed at different intervals or after the replication process. In addition, parameters such as Signal to Noise ratio (SNR) of the replicated layers, and other replicated data layer information can be recorded in a certain reserved region of the holographic disc. Further, as discussed below, the replication systems may be configured to register or align the master with the disc, and/or register or align the replicated layers with each other.

Figure 3:
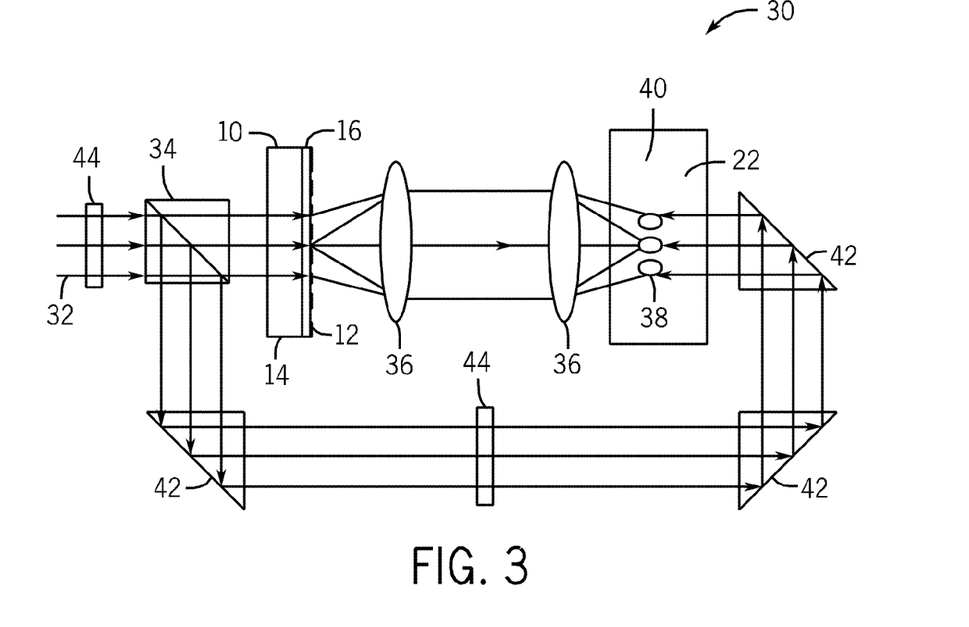
FIG. 3 is a diagrammatical representation of disc replication employing transmission geometry in accordance with an embodiment of the present technique.

FIG. 3 depicts an exemplary replication system 30 for replicating holographic discs 22 using transmission geometry. A master 10 having a single layer of data is employed. In the illustrated embodiment, the master 10 has the data layer 12, a substrate 14, and optionally an intermediate layer 16. In implementation, an incoming laser beam 32 passes through a beam splitter 34 and splits into two beams. One of the beams is passed through the master 10 and two lenses 36, and interferes with the other beam that passes through three corner prisms 42 and into the opposite side of the disc 22. Interference of the two split beams forms micro-holograms 38 (containing data 12 from the master 10) in a data layer 40 of a disc 22. The data layer 40 is an interference of a planewave with the image of the data 12 pattern in the master disc 10. In addition, the optical waveplates (e.g., half waveplates) may be inserted in the system 30 to balance the optical powers in the two split beams so that increased or maximum modulation can be achieved when the two beams interfere to form the micro-holograms in the disc 22.

Figure 4:
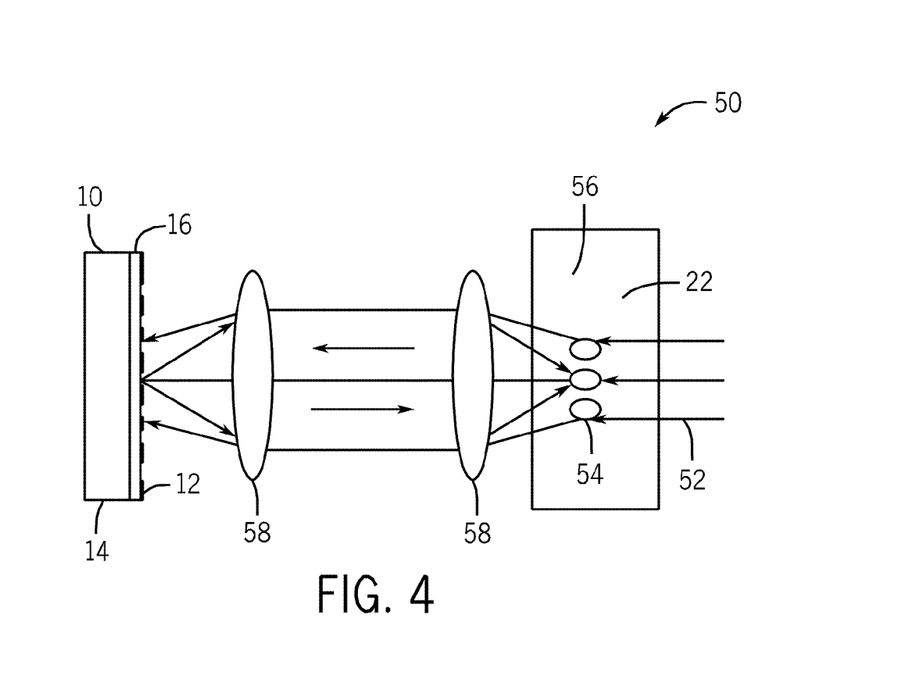
FIG. 4 is a diagrammatical representation of disc replication employing reflection geometry in accordance with an embodiment of the present technique.

FIG. 4 depicts an exemplary replication system 50 for replicating holographic discs 22 using reflection geometry. A master 10 having a single layer of data 12 is employed. In the illustrated embodiment, the master 10 has the data 12, a substrate 14, and optionally an intermediate layer 16. In implementation, an incoming laser beam 52 passes through the disc 22 and lenses 58 to a reflective master 10, and is reflected back through the lenses 58 into the disc 22. This reflected beam interferes with the original beam 52 to form micro-holograms 54 (containing data 12 from the master 10) of data layer 56. Thus, again, the reflected beam interferes with the incoming laser beam. Consequently, the data layer 56 is an interference of a planewave with the image of the data 12 pattern in the master disc 10. As indicated, the master disc 10 will generally have reflective materials to facilitate replication in the reflective optics system 50. In all, the systems 30 and 50 may typically have polarization optics control the beam power balance between the two interfering beams to achieve increased or maximum modulation in the micro-holograms (i.e., improved quality).

Figure 5:
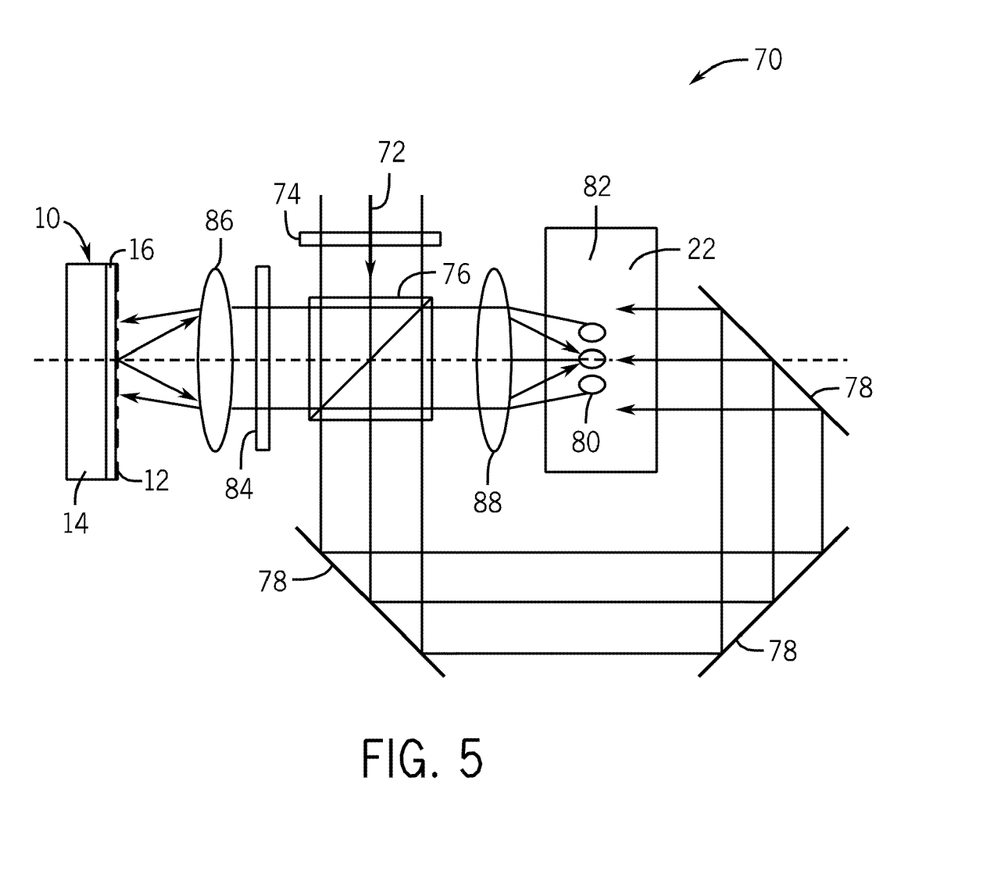
FIG. 5 is a diagrammatical representation of disc replication including polarization optics to control beam power balance in accordance with an embodiment of the present technique.

FIG. 5 is an exemplary replication system 70 for replicating holographic discs 22. The system 70 includes polarization optics to control the balance of beam power between the two interfering beams to increase modulation in the micro-holograms, and to thus improve quality of the micro-hologram. In system 70, an incoming laser beam 72 passes through a half-wave plate 74 and a polarized beam splitter 76. In the illustrated embodiment, a split beam of the incoming beam 72 exits the beam splitter 76 and is reflected off three mirrors 78 to the backside of the replicated disc 22 as the reference beam to form micro-holograms 80 in the data layer 82 of the disc 22. The data beam that interferes with the reference beam to complete formation of the micro-holograms 80 is sourced from a split beam (from splitter 76) that passes through a quarter wave plate 84, lens 86, and is reflected off the master disc 10 back through the lens 86, quarter wave plate 84 and beam splitter 76. This beam reflected from the master disc 10 then passes through an optical lens 88 to the data layer 82 of the disc 22.

With regard to FIGS. 3-5, the aforementioned free-space optics, fiber beam delivery, and so on, may contribute to lower costs, easier setup, and flexibility. The illustrated replications systems 30, 50, and 70, and other replications systems, may be expanded to include additional features. For example, tracking/focusing features, disc alignment features, and the like may be incorporated to assist replication.

Figure 6:
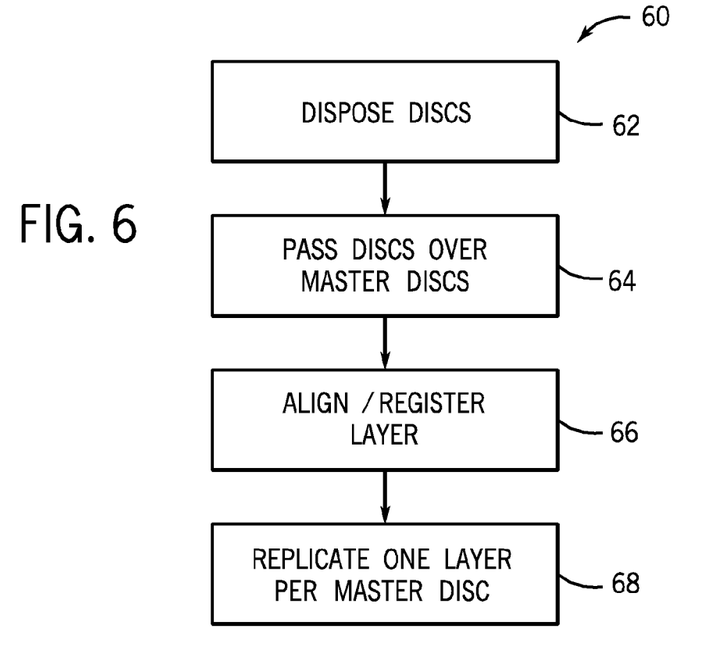
FIG. 6 is a block diagram of a method of disc replication in accordance with an embodiment of the present technique.

FIG. 6 depicts a method 60 for replicating optical discs having multiple layers of data (e.g., holographic discs) from master discs having a single layer of data. In this method 60, multiple holographic discs (i.e., "n" number of discs) are disposed on a structure configured to move the discs (block 62). The discs are moved passed multiple stationary master discs (i.e., "n" number of master discs), each master disc having a single data layer to be replicated on the discs (block 64). The master discs may be disposed at replicating stations, which are engaged by the replicated holographic discs on the movable structure, for example. Moreover, it should be noted that the method 60 may incorporate alignment/registration sequences for replicated layers of the holographic discs (block 66). For instance, to facilitate replication, the holographic discs may be aligned with each master disc at the replicating stations. In addition, replicated layers of data may be registered with one another in a given holographic disc.

For an example of such registration, see FIGS. 8 and 9 and associated text below. With or without alignment or registration, the data layer of each master disc is optically replicated to the disc one layer at a time (block 68). It should be apparent that several discs may be replicated in parallel or simultaneously with data layers from respective master discs. Such a parallel configuration and operation may increase replication throughput.

Figure 7:
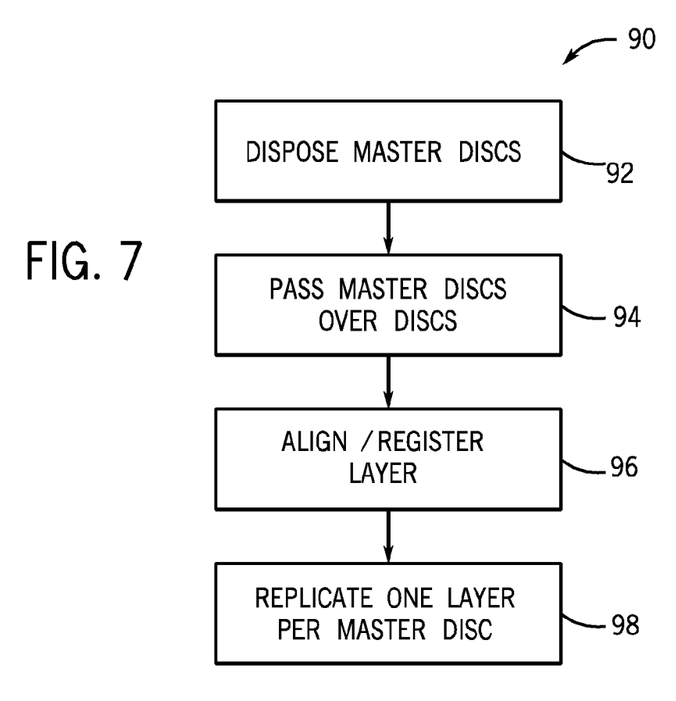
FIG. 7 is a block diagram of a method of disc replication in accordance with an embodiment of the present technique.

FIG. 7 depicts a method 90 for replicating optical discs having multiple layers of data (e.g., holographic discs) from master discs having a single layer of data. Multiple master discs (i.e., "n" number of master discs) having a single layer of data to be replicated are disposed on a structure configured to move the master discs (block 92). The master discs are moved passed multiple stationary holographic discs (i.e., "n" number of holographic discs), each master disc having a single data layer of holographic data to be replicated on the discs (block 94). The holographic discs may be disposed at replicating stations which are engage by the master discs on the movable structure, for example. Moreover, as with the system 70 of FIG. 6, the method 90 may also incorporate an alignment and/or registration sequence for replicated layers of the holographic discs (block 96). For instance, to facilitate replication, the holographic discs may be aligned with each master disc at the replicating stations. In addition, replicated layers of data may be registered with one another in a given holographic disc. For an example of such registration, see FIGS. 8 and 9 and associated text below. With or without alignment/registration, the data layer of each master disc is optically replicated to the disc one layer at a time (block 98). As with the system 70 of FIG. 6, several discs may be replicated in parallel or simultaneously with data layers from respective master discs. Again, such a parallel configuration and operation may increase replication throughput.

Registration

If a separate master disk is used for each layer, it may, in some cases, be beneficial to provide a method and system whereby the layers may all be aligned or angularly registered with respect to one another. Advantageously, this may arrange the data on various levels so that the data can be read more seamlessly in time, i.e., the data might be arranged so that the disc may not have to turn through much of an angle as the reader goes from an upper layer to the next lower layer before the data is ready to read from the lower layer. This may be favorable, as the disc's rotation is slow compared to the rate at which data may be read off of the disc. It may therefore be worthwhile to provide for a bit sequence laid along one of the tracks (e.g., the outermost track). In one example (in the disc and hologram structure), filling the outermost track may fill about a million bits.

Figure 8:
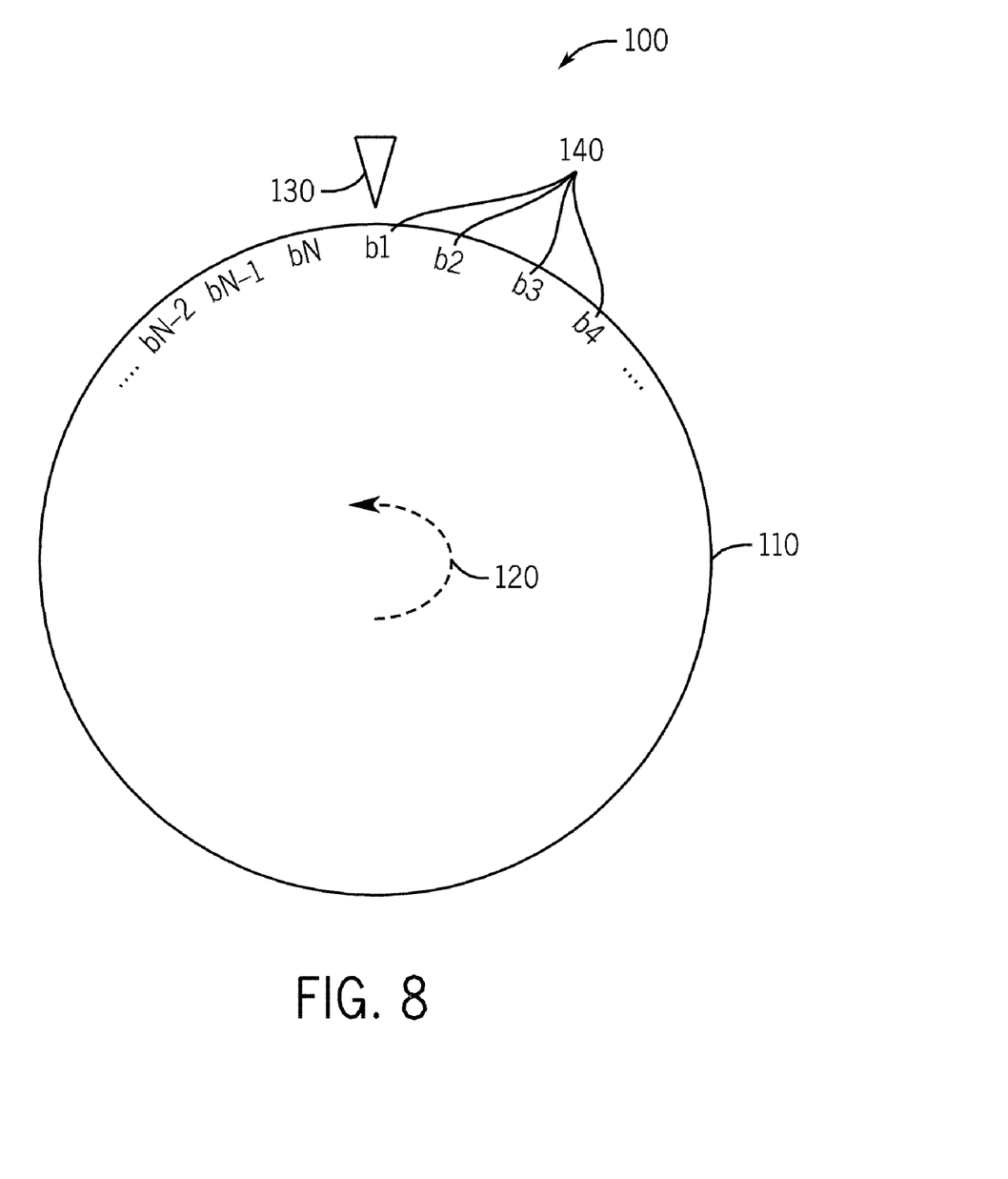
FIG. 8 is diagrammatical representation of a N-bit sequence system in for registration of replicated layer in accordance with an embodiment of the present technique.

FIG. 8 illustrates a system 100 where an N-bit sequence 140 is laid on the outermost track of the master discs (one of these is shown 110). The N-bit sequence 140 is also laid on the outermost track on at least one layer of the multi-layer disc (not shown) that is being created from the individual layer master discs. The angular direction of rotation is indicated 120. A reader 130 is positioned to read the individual bits of the N-bit sequence 140 as they pass by in proximity to it.

Figure 9:
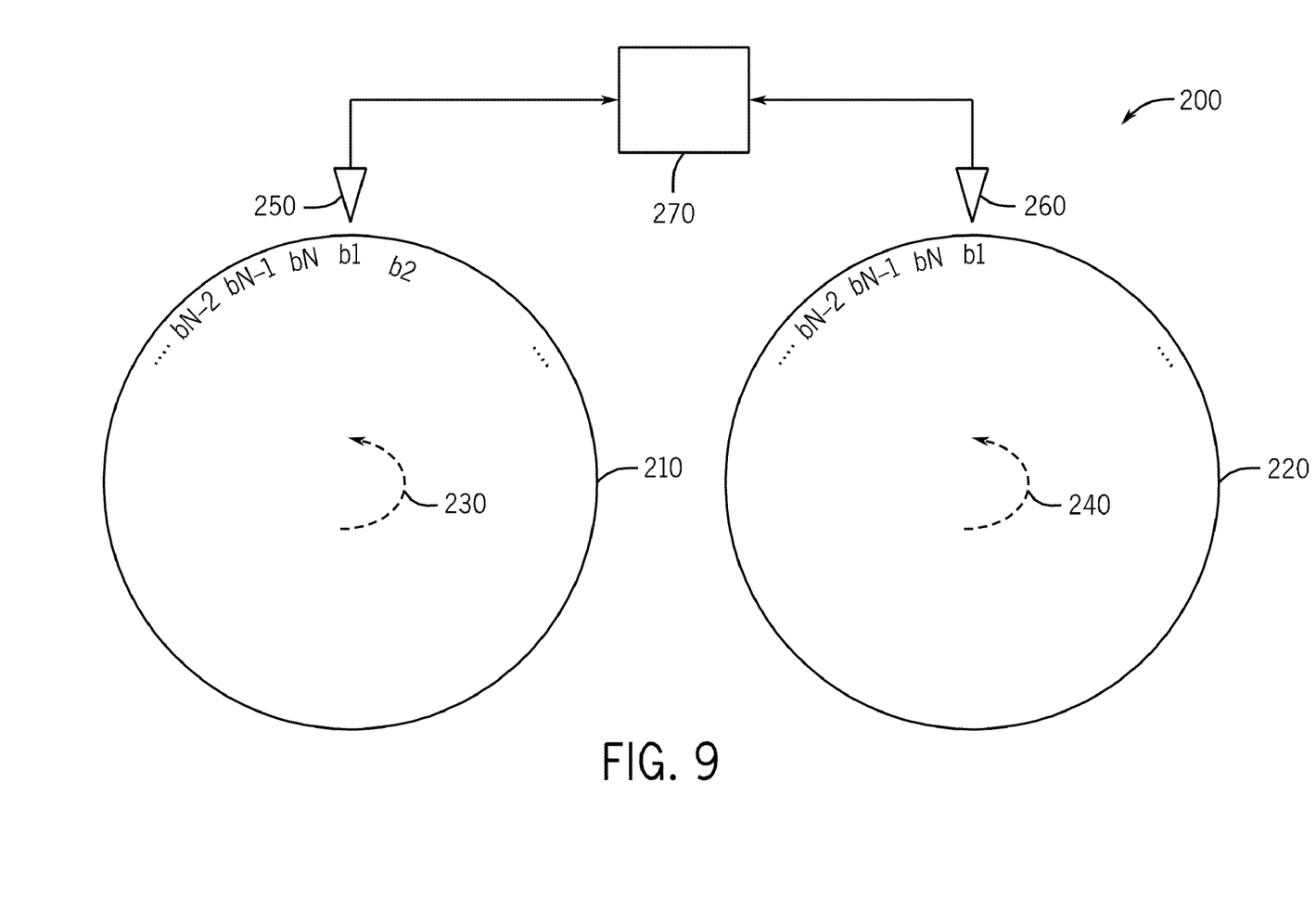
FIG. 9 is a diagrammatical representation of a master disc and multi-layer disk employing the system of FIG. 7 in accordance with an embodiment of the present technique.

FIG. 9 illustrates a system 200 showing one of the single master disks 210 and a multi-layer disk 220. The N-bit sequence on the outermost track of the single master disk is read by reader 250. The N-bit sequence that is on the outermost track of at least one layer of the multi-layer disk 220 is read by reader 260. Module 270 adjusts the relative angular positions of disk 210 and disk 220 and brings the angular velocities 230 and 240 of the two disks to the same value. The two disks, disk 210 and disk 220, are thereby brought into synchronization. And the replication system replicates the data on disk 210 to disk 220.

One embodiment of the N-bit sequence 140 may be a segment of what is known in the art as a 2-ary de Bruijn sequence of order n. One of the advantages of using such a sequence may be that in the full sequence generally every possible subsequence of length n occurs exactly once. Thus, once n consecutive bits have been read from the track, the rotational angle of the disk is typically knowable. In practice, a look-up table of n-bit values versus disk rotational angle may be prepared and stored so that any n-bit consecutive segment will allow the disk rotational angle to be determined by finding the n-bit sequence in the look-up table and noting the corresponding disk rotational angle.

In view of the foregoing, a benchmark may be defined for a disk's rotational angle by selecting a particular n-bit segment corresponding to a null rotation. The N-bit 2-ary de Bruijn sequence of order n will be sufficient to uniquely identify disk rotational angle provided that $2^n$ is no less than the total number of bits needed to populate the disk's track containing the segment of the de Bruijn sequence. For N=1,000,000 bits, for example, the minimum order of the necessary de Bruijn sequence is n=20 as $2^{19} < 1000000 \leq 220^{20}$.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of replicating optical data storage discs, comprising:
    providing multiple master discs, each having a respective single layer of data; and
    optically replicating each respective single layer of data serially from each of the multiple master discs into an optical data storage disc comprising multiple layers of data.

2. The method of claim 1, wherein replicating comprises moving the optical data storage disc into a position adjacent to the master discs.

3. The method of claim 1, wherein replicating comprises moving the master discs into a position adjacent to the optical data storage disc.

4. The method of claim 1, wherein a plurality of optical data storage discs are replicated simultaneously.

5. The method of claim 1, comprising aligning the each of the multiple master discs with the optical data storage disc when optically replicating the respective single layer of data from the master disc into the optical data storage disc.

6. The method of claim 1, wherein the multiple layers of data on the optical data storage disc are aligned with respect to one another.

7. The method of claim 6, wherein the alignment is implemented via a registration sequence.

8. The method of claim 7, wherein the registration sequence comprises a segment of a de Bruijn sequence.

9. The method of claim 1, comprising aligning each of the multiple master discs with the optical data storage disc via alignment marks on the master disc and on the optical disc.

10. The method of claim 1, comprising performing a quality check of the replicating.

11. The method of claim 1, wherein parameters related to replication are stored at a designated region of the optical data storage disc.

12. The method of claim 11, wherein the parameters comprises a signal-to-noise ratio of at least one layer determined after replication and recorded in the designated area.

13. The method of claim 1, comprising aligning tilt of at least one of the multiple master discs and the optical data storage disc.

14. The method of claim 13, wherein aligning tilt comprising aligning tilt via tilt alignment marks on the at least one of the multiple master discs and the optical data storage disc.

15. A method of replicating holographic storage discs, comprising:
providing multiple master discs each providing for a respective single layer of data to be replicated on a holographic data storage disc; and
replicating each respective layer of data serially from one of the multiple master discs into a holographic data storage disc.

16. The method of claim 15, wherein providing master discs comprises disposing the master discs at stations, and wherein replicating comprises moving the holographic disc to each station.

17. The method of claim 15, wherein the respective single layer of data of at least one of the master discs comprises non-holographic data.

18. The method of claim 15, wherein replicating comprises replicating each respective layer of data via optical interference using a beam transmitted through the master disc.

19. The method of claim 15, wherein replicating comprises replicating each respective layer of data via optical interference using a beam reflected from the master disc.

20. The method of claim 15, wherein replicating comprises employing reduction optics, and wherein a size of a bit replicated on the holographic data storage disc is smaller than a size of a corresponding bit on the master disc.

21. The method of claim 15, comprising removing heat from the holographic data storage disc.

22. The method of claim 15, comprising aligning tilt of at least one of the master discs and the holographic data storage disc.

23. The method of claim 15, wherein at least one of the master discs comprises a spatial light modulator.

24. The method of claim 15, wherein the replicated holographic data storage discs comprises both pre-recorded content and pre-format bits.

25. The method of claim 15, wherein the master discs comprise a single master disc comprising a spatial light modulator (SLM), and wherein states of pixels in the SLM are electrically changed to provide for replication of different layers of data.

* * * * *